Dec. 22, 1970    R. P. MILES ET AL    3,548,433
MOTORIZED YARD RAMP

Filed Sept. 27, 1968    3 Sheets-Sheet 1

INVENTORS
RAY P. MILES
ANDREW E. SZUCS
BY
ATTORNEY

INVENTORS
RAY P. MILES
ANDREW E. SZUCS

BY

ATTORNEY

Dec. 22, 1970  R. P. MILES ET AL  3,548,433
MOTORIZED YARD RAMP

Filed Sept. 27, 1968  3 Sheets-Sheet 3

United States Patent Office 3,548,433
Patented Dec. 22, 1970

3,548,433
MOTORIZED YARD RAMP
Ray P. Miles, 8575 W. Melody Lane, Macedonia, Ohio 44056, and Andrew E. Szucs, 4479 W. 226th St., Fairview Park, Ohio 43736
Filed Sept. 27, 1968, Ser. No. 763,175
Int. Cl. E01d *15/12*
U.S. Cl. 14—72         6 Claims

ABSTRACT OF THE DISCLOSURE

A motorized yard ramp is provided with means for self-locomotion and is dirigible. Controls are provided to enable a single operator to move the ramp into a work position. The ramp is further provided with means for limited vertical adjustment.

---

This invention relates to a motorized yard ramp of the type adapted to facilitate loading and unloading of mobile carriers, such as railroad freight cars and the like. The invention also exhibits utility in other types of carriers such as airplanes and large trucks. In general, the invention facilitates the loading and unloading of such vehicles and is further characterized by its ability to be towed along highways. In general, the invention relates to a dirigible ramp having its own power supply and a set of controls which enables a single operator to precisely position the ramp at a desired locale in an unloading or in a loading area with respect to either a shipping or a storing container.

In general, a mobile yard ramp fabricated according to the practice of this invention includes a pair of driving wheels positioned approximately midway of the length of the ramp, with the driving wheels associated with differential drive means and a prime mover. A third wheel is provided longitudinally of the ramp and imparts stability to the ramp. When exact positioning of the ramp has been accomplished, the third wheel is withdrawn and that end of the ramp nearest the wheel comes into engagement with the ground. The ramp of this invention may further be provided with a safety surface grating to increase the friction between the ramp and any mobile carrier, such as a pallet truck used for loading or unloading purposes. A variety of advantages will immediately become apparent to those skilled in this art from a consideration of the following.

Figure 1:
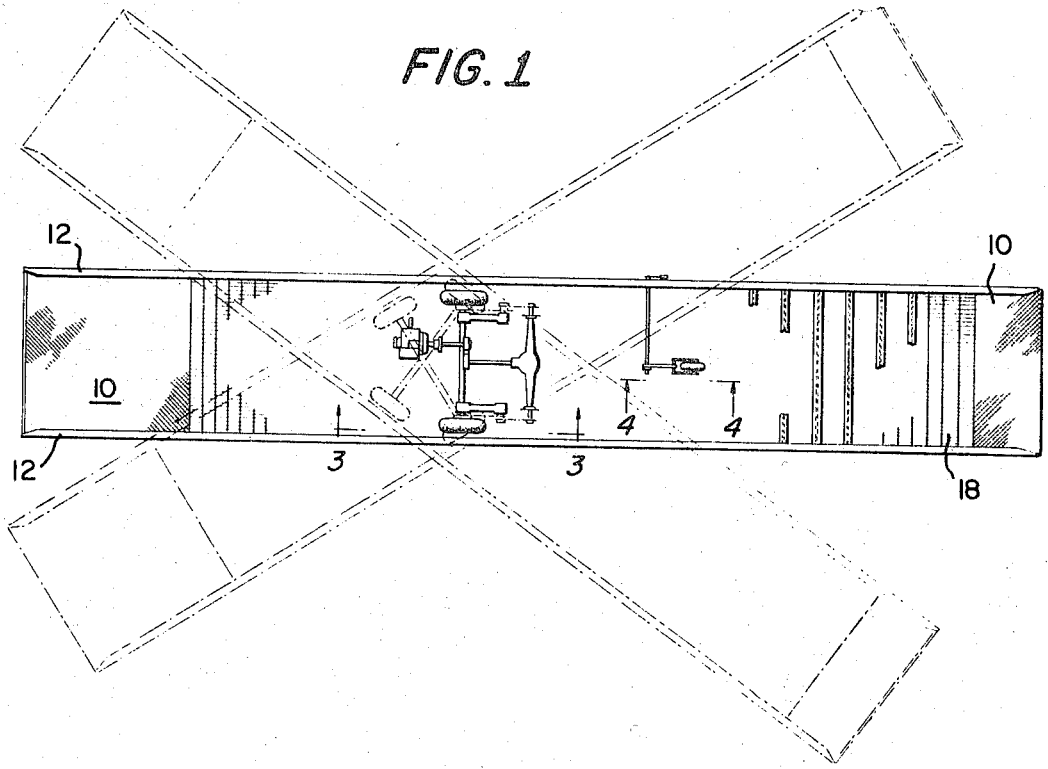
FIG. 1 is a plan view of the complete ramp and illustrates, by the phantom lines, the maneuverability of the ramp.
Figure 2:
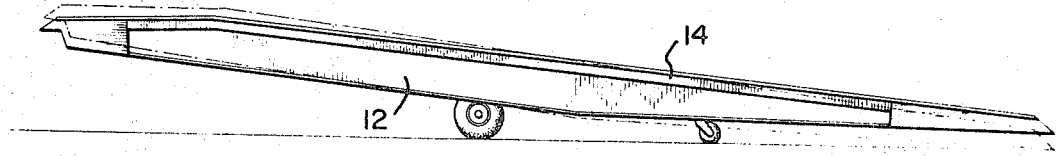
FIG. 2 is a side elevational view of the complete ramp with its internal drive and trailing third wheel, all in the lowermost position for ease in transporting the ramp, as by towing.
Figure 3:
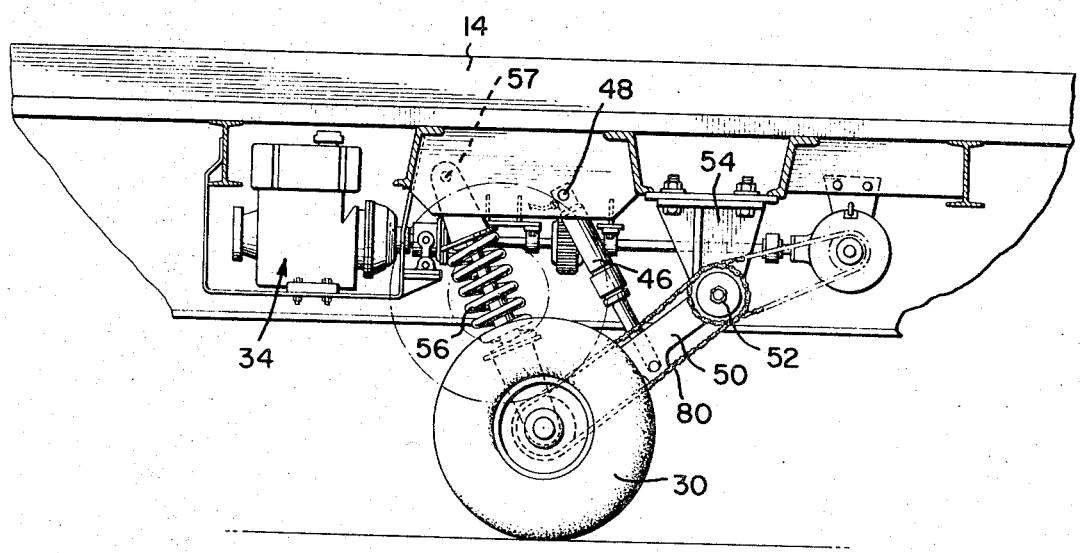

FIG. 3 of the drawings is a side elevational view of the complete drive assembly and hydraulic type cylinders for raising and lowering the ramp, and may be considered a partial view of FIG. 2.

Figure 4:
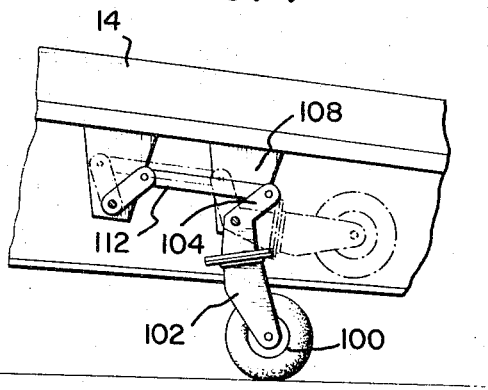

FIG. 4 of the drawings illustrates the trailing or third wheel and its actuating linkage in its lower position.

Figure 5:
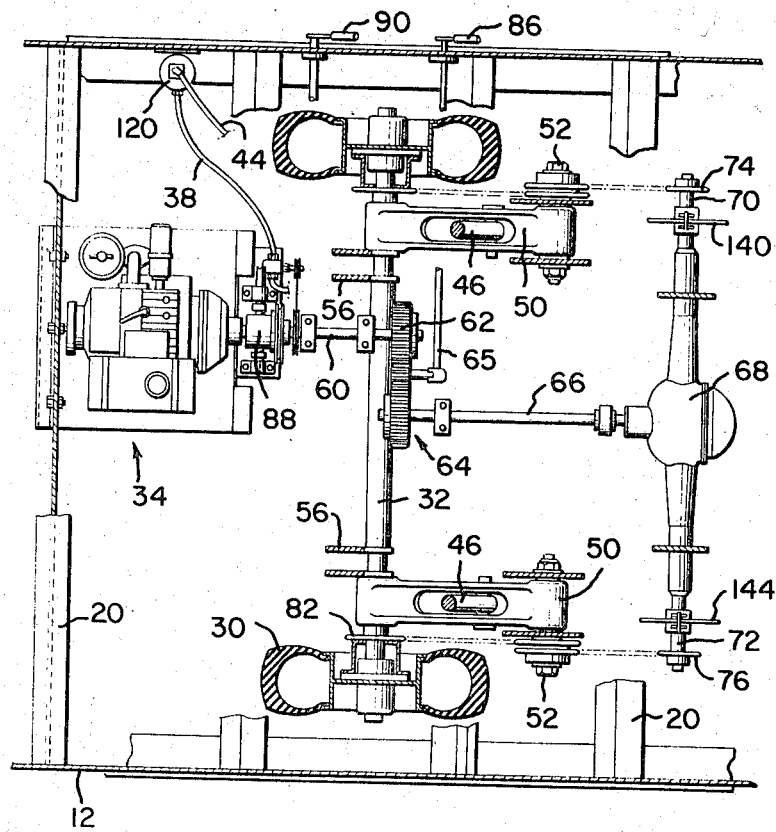

FIG. 5 is a plan view of the complete internal drive assembly, including the prime mover for making the device completely self-mobile.

Figure 6:
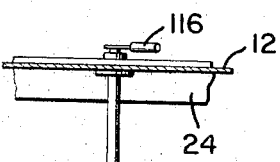

FIG. 6 is a plan view of the trailing or third wheel and linkage.

Figure 7:
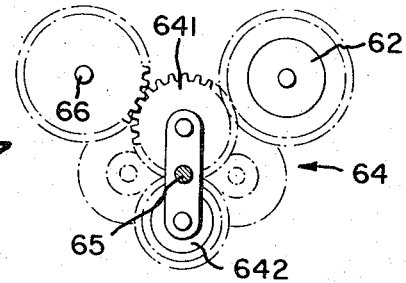

FIG. 7 is a side view of drive gears for reversing direction.

Figure 8:
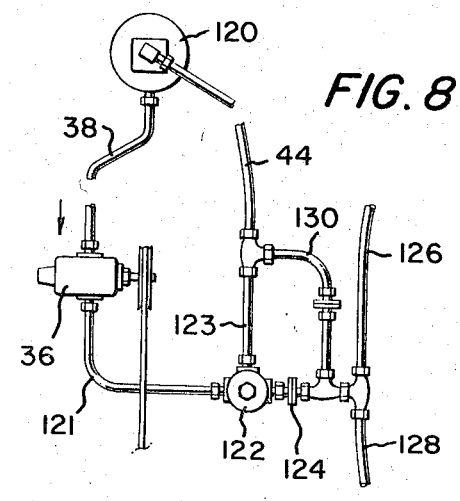

FIG. 8 is a plan view of the hydraulic system for controlling a hydraulic power cylinder which raises and lowers the ramp for adjustment to accommodate varying heights of carriers.

Figure 9:
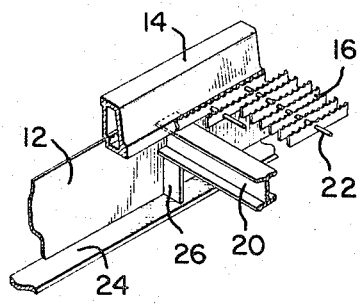

FIG. 9 is a fragmentary perspective view of the elements involved in the basic construction of the ramp.

Referring now to the drawings, the motorized yard ramp of this invention is defined by a generally rectangular and elongated ramp having sheet metal surface end portions 10. The sides of the ramp are denoted by the numeral 12 and upper rim portions 14 extend generally throughout the length of the ramp. Numeral 16 denotes a grating strip having serrated edges, the strips mounted together to define a main surface portion 18 of the ramp having extremely high friction qualities. This enables high traction between the ramp and any loading or unloading vehicle travelling thereon. The grating members 16 may be held in parallel relationship by transversely extending rod members 22, as shown at FIG. 9. Cross beam members 20 are welded to the side elements 12 and 14 at spaced longitudinal portions, while the lower portion of side elements 12 may be stiffened by means of longitudinal runner elements 24, in cooperation with additional stiffener elements 26 secured to the underside of transverse beam members 20.

The numeral 30 denotes either one of two wheels as in the form of conventional tires which are mounted on the ends of a single axle 32. The numeral 34 denotes in general a prime mover or power source, such as a gasoline engine, and is mounted generally midway of one of the transverse beam elements 20. The numeral 36 denotes a hydraulic pump suitably coupled, as by means of a belt and pulley, to the power output of the power means 34.

A fluid motor 46 has one end pivoted to a reinforced underside portion of the ramp designated as noted by the numeral 48, while the other end of the motor 46 is coupled to an elongated arm or plate 50. It will be understood that there are two such hydraulic motors 46, with each being fed from the pump 36.

Each arm 50 carries at one of its ends a portion of the axle 32 and is pivoted at its other end to pivot point 52. The latter pivots are carried by mounting bracket 54 secured to a reinforced portion of the ramp. Shock absorbing devices 56 each have one end secured to axle 32 and their other ends are releasably secured, as by pins 57, to the underside of the ramp.

The numeral 60 denotes a portion of the output shaft of the power means 34 and is coupled to gear 62. The numeral 64 denotes generally reversing gearing between the power gear 62 and the input power shaft 66 to a differential 68. Output shafts 70 and 72 are secured to the differential 68 and carry at their outer ends sprocket wheels 74 and 76. Sprocket chains from these elements are connected to sprocket wheels mounted on pivot 52. These latter wheels, in turn, each carry a connected sprocket wheel and chain, the latter such as indicated by the numeral 80 of FIG. 3. Sprocket wheels 82 are secured to and rotate the wheels 30. It will be apparent then that power from power output shaft 60 and output gear 62 is through the gearing 64 to shaft 66 and then to differential 68. The differential 68 is of conventional construction and, as known to workers in this art, will enable one of the wheels 30 to rotate at a different rate than the other when the entire device is being turned about an axis generally at right angles to the ramp. Power from sprocket wheels 74 and 76 finds its way through intermediate sets of sprocket wheels and chains to the wheels 30.

As shown in detail at FIG. 7 of the drawings, the gearing 64 defines a reverse direction arrangement wherein the two main gears are coupled either by a single gear 641 (in the illustrated position) to give a first rotary direction to shaft 66, or coupled by the two gears 641 and 642 (as shown in the dashed position) to give a second or opposite direction of rotation to shaft 66. Rotation of shaft 65 will effect the described change in position of gears 641 and 642, with the shaft 65 being controlled by rotating hand lever 86 positioned exteriorally of the ramp for easy access. It will be understood that before such a direction change may be effected, clutch mechanism 88 must be disengaged by a rotating hand lever 90, also positioned on the exterior of the ramp near the lever 86. The drive mechanism of FIG. 7 may be changed to a hydraulic instead of a mechanical drive.

Turning now to FIGS. 4 and 6 of the drawings in particular, the numeral 100 denotes a third wheel positioned an appreciable distance from the wheel 30 and suitably mounted on the underside of the ramp and preferably midway thereof. The wheel is of the self-aligning or caster type, its mounting including a nearly vertical pivot to allow for swivel motion and direction changes. A forked bracket 102 is secured to a pair of upstanding ear portions 104 and 106, with the latter being pivoted to downwardly extending support plates 108 and 110 from the underside of the ramp. A bar lever 112 extends from a pivot pin coupling the ends of the ears 104 and 106 to the indicated linkage defined by an elongated rod 114, suitably supported and positioned along the ramp, and an arm extending from one end thereof and a handle 116 at the other end. The handle 116 is manually operable and, as the reader will appreciate by consideration of FIGS. 4 and 6 of the drawings, the rotation of this handle will cause the third wheel 100 to assume either the solid illustrated position of FIG. 4 of the dashed position of FIG. 4 or the dashed position thereof. In the latter position, the right end of the ramp (FIG. 2) will touch the ground.

Referring now to FIG. 8 of the drawings, the description of the hydraulic circuitry which effects the raising and the lowering of wheels 30 will now be offered. Firstly, the releasable pin 57 is removed. The numeral 120 denotes a fluid reservoir positioned in the indicated hydraulic circuit. A line 121 leads from the output of the pump 36 to the common input port of a three-way valve 122. It will here be observed that the valve 122 is accessible to the outside of the ramp, as by means of an aperture in one of the sides, to enable the hand of an operator to actuate the valve for a purpose which will now be explained. One line 123 of the valve 122 leads directly through a tee to line 44 and thence back through the reservoir 120. This is the flow of the hydraulic fluid in the non-moving or lowermost position of the wheels 30. Thus, with the prime mover 34 running, there is merely a circulation of the hydraulic fluid between the pump 36 and the reservoir 120. When it is desired to raise the left (FIG. 2) end of ramp 30 by actuating the hydraulic motors 46, the valve 122 is turned so that no fluid now flows through line 123, rather fluid flows through check valve 124 and thence divides. A portion of this divided flow passes through line 130 and thence through line 44 back to the reservoir 120. The other divided portion leads into lines 126 and 128, these feeding directly into the hydraulic motors 46. Thus, when the wheels are being moved relative to the ramp, there is some flow from the pump back into the reservoir.

Steering of the device is effected by two disc brake elements 140 and 144, secured, as indicated, to the output shafts of differential 68. In practice, steering is effected by applying a friction brake (not illustrated) to one or the other of the discs. This is done by means of conventional brake shoe elements actuated by levers, such as lever 90, as shown at FIG. 5.

What is claimed is:
1. A dirigible, mobile yard ramp including:
 (a) an elongated, ambulatory ramp having a substantially planar and rectangular top surface and having first wheel means at a first longitudinal portion thereof,
 (b) retractable second wheel means longitudinally spaced from said first wheel means,
 (c) power means carried by said ramp for rotating said first wheel means,
 (d) said first wheel means comprising adjusting means operable generally perpendicularly with respect to the top surface of the ramp, to thereby effect vertical positioning of an end of the ramp.
2. The mobile yard ramp of claim 1 wherein
 (a) said first wheel means is defined by a pair of wheels,
 (b) motor means for effecting adjustment of said wheels towards and away from the planar top surface of the ramp.
3. The mobile yard ramp of claim 2,
 (a) said second wheel means defined by a retractable wheel secured to the underside of said ramp, said wheel retractable to a position allowing an end of the ramp to contact the ground,
 (b) said second wheel having a mounting which is pivoted about a generally vertical axis to allow for self-alignment,
 (c) a shock absorbing member releasably mounted between the ramp and said first wheel means.
4. The mobile yard ramp of claim 3,
 (a) including means to reverse the direction of rotation of the first wheel means,
 (b) including clutch means to couple the power means to said first wheel means.
5. The mobile yard ramp of claim 4,
 (a) wherein the top surface of the ramp is defined by a plurality of parallel and elongated grating members having roughened edges.
6. The mobile yard ramp of claim 5 wherein steering of the ramp is effected by,
 (a) brake means for independently braking the wheels of said first wheel means to thereby effect steering of the mobile yard ramp.

References Cited
UNITED STATES PATENTS

| | | | |
|---|---|---|---|
| 2,597,213 | 5/1952 | Whiteman | 14—72 |
| 2,835,400 | 5/1958 | Latzke | 214—505X |
| 2,861,811 | 11/1958 | Lassen | 214—505UX |
| 3,123,167 | 3/1964 | Lichti | 14—72X |
| 3,184,772 | 5/1965 | Moore | 14—72 |
| 3,246,782 | 4/1966 | Ballamy | 214—506 |

JACOB L. NACKENOFF, Primary Examiner

U.S. Cl. X.R.
214—505